(12) United States Patent
Minnich et al.

(10) Patent No.: US 7,905,283 B2
(45) Date of Patent: *Mar. 15, 2011

(54) PROCESS FOR REMOVING SILICA IN HEAVY OIL RECOVERY

(75) Inventors: Keith R Minnich, Pewaukee, WI (US); Dan Peterson, Renton, WA (US)

(73) Assignee: HPD, LLC, Plainfield, IL (US)

( * ) Notice: Subject to any disclaimer, the term of this patent is extended or adjusted under 35 U.S.C. 154(b) by 345 days.

This patent is subject to a terminal disclaimer.

(21) Appl. No.: 12/199,348

(22) Filed: Aug. 27, 2008

(65) Prior Publication Data

US 2009/0056945 A1 Mar. 5, 2009

Related U.S. Application Data

(60) Provisional application No. 60/968,180, filed on Aug. 27, 2007.

(51) Int. Cl.
*E21B 43/24* (2006.01)
*E21B 43/40* (2006.01)

(52) U.S. Cl. ............ 166/272.3; 166/266; 166/267; 166/371

(58) Field of Classification Search ............. None
See application file for complete search history.

(56) References Cited

U.S. PATENT DOCUMENTS

| | | | |
|---|---|---|---|
| 3,193,009 A | 7/1965 | Wallace et al. | |
| 4,663,367 A | 5/1987 | Navratil et al. | |
| 4,877,536 A | 10/1989 | Bertness et al. | |
| 5,611,931 A | 3/1997 | Liu et al. | |
| 5,925,255 A | 7/1999 | Mukhopadhyay | |
| 6,165,553 A | 12/2000 | Chen et al. | |
| 6,401,819 B1 | 6/2002 | Harris et al. | |
| 6,536,523 B1 | 3/2003 | Kresnyak et al. | |
| 6,733,636 B1 | 5/2004 | Heins | |
| 6,734,144 B2 | 5/2004 | Varadaraj et al. | |
| 6,740,141 B2 | 5/2004 | Espin et al. | |
| 7,037,434 B2 | 5/2006 | Myers et al. | |
| 7,077,201 B2 | 7/2006 | Heins | |
| 7,150,320 B2 | 12/2006 | Heins | |
| 2005/0279500 A1 | 12/2005 | Heins | |
| 2006/0032630 A1 | 2/2006 | Heins | |

OTHER PUBLICATIONS

Kok, Sandra and Doyle, Edward; "Removal of Total Dissolved Solids", Produced Water Treatment Design Manual, Ch. 5, pp. 5-1 through 5-23.
Zaidi, S.A., et al.; "The Use of Vapour Compression Evaporation for Removing Total Dissolved Solids from Produced Water"; Heavy Oil and Oil Sands Technical Symposium, Challenges and Innovations—1988; Mar. 16, 1988; pp. 1-22.
Koren, A. and Nadav, N.; "Mechanical Vapour Compression to Treat Oil Field Produced Water"; Desalination, 98 (1994) pp. 41-48; Elsevier Science B.V. Amsterdam.
Kok, S., et al.; "Total Dissolved Solids Removal from Water Produced During the In Situ Recovery of Heavy Oil and Bitumen": Petroleum Society of CIM, Paper No. 86-37-64; pp. 367-373.

*Primary Examiner* — Zakiya W. Bates
(74) *Attorney, Agent, or Firm* — Coats & Bennett, PLLC.

(57) ABSTRACT

A process for recovery oil includes recovering an oil/water mixture from an oil well. Thereafter, the method includes separating oil from the oil/water mixture to produce an oil product and produced water having dissolved silica therein. The produced water is directed to an evaporator and produces steam and a concentrated brine. The method or process entails mixing a precipitant or crystallizing reagent with the produced water or the concentrated brine and causing the silica to precipitate from the produced water or the concentrated brine. Steam produced by the evaporator is condensed to form a distillate which is directed to steam generator. At the steam generator the distillate is heated to produce steam which is injected into an injection well, giving rise to the formation of the oil/water mixture.

24 Claims, 5 Drawing Sheets

PROCESS FOR REMOVING SILICA IN HEAVY OIL RECOVERY

CROSS-REFERENCE TO RELATED APPLICATION

This application claims priority under 35 U.S.C. §119(e) from the following U.S. provisional application: Application Ser. No. 60/968,180 filed on Aug. 27, 2007. That application is incorporated in its entirety by reference herein.

FIELD OF INVENTION

The present invention relates to a process for recovering heavy oil, and more particularly, to an oil recovery process that utilizes a mechanical vapor compression evaporation system to treat produced water.

BACKGROUND

Conventional oil recovery involves drilling a well and pumping a mixture of oil and water from the well. Oil is separated from the water, and the water is usually injected into a sub-surface formation. Conventional recovery works well for low viscosity oil. However, conventional oil recovery processes do not work well for higher viscosity, or heavy, oil.

Enhanced Oil Recovery processes employ thermal methods to improve the recovery of heavy oils from sub-surface reservoirs. The injection of steam into heavy oil bearing formations is a widely practiced enhanced oil recovery method. Typically, several tons of steam are required for each ton of oil recovered. Steam heats the oil in the reservoir, which reduces the viscosity of the oil and allows the oil to flow to a collection well. Steam condenses and mixes with the oil, the condensed steam being called produced water. The mixture of oil and produced water that flows to the collection well is pumped to the surface. Oil is separated from the produced water by conventional processes employed in conventional oil recovery operations.

For economic and environmental reasons it is desirable to recycle the produced water used in steam injection enhanced oil recovery. This is accomplished by treating the produced water, producing a feedwater, and directing the treated feedwater to a steam generator or boiler which produces steam. The complete water cycle includes the steps of:
  injecting the steam into an oil bearing formation,
  condensing the steam to heat the oil whereupon the condensed steam mixes with the oil to form an oil-water mixture,
  collecting the oil-water mixture in a well,
  pumping the oil-water mixture to the surface,
  separating the oil from the oil-water mixture to yield produced water,
  treating the produced water so that it becomes the steam generator or boiler feedwater, and
  converting the feedwater into steam that has a quality suitable for injecting into the oil bearing formation.

Treating the produced water to prepare feed water for steam generation is challenging. It is known to chemically treat the produced water and subject the produced water to an evaporation process to form distillate for steam generation feed water. In particular, it is known to use an evaporator and mechanical vapor compressor to produce the distillate. However, the produced water typically contains significant amounts of silica-based compounds. These silica-based compounds will tend to foul evaporator and other process surfaces by scaling or deposition of silica on the surfaces. These scales reduce the conductivity of heat transfer elements in the equipment and thus reduce the efficiency of evaporation and steam generation. To prevent or retard fouling of the evaporator heat transfer surfaces from silica-based scaling, the pH of the feed to the evaporator is conventionally raised to maintain the solubility of silica.

There are drawbacks and disadvantages to the current processes. The addition of caustic to raise the pH represents a significant operating cost. The high concentration of caustic is typically not desirable in waste streams. Additionally, while the mechanical vapor compression evaporator recovers approximately 95% of the water from the produced water, the remaining concentrate stream is difficult to process. The pH of the remaining concentrate stream is usually higher than 12. Neutralizing the stream causes the precipitation of solids, and these solids are very difficult to separate from the aqueous solution. The neutralization process is also known to sometimes release gases such as hydrogen sulfide. These systems tend to be expensive to operate and costly to maintain. Moreover, produced water often includes significant amounts of calcium and magnesium which contribute to hardness. The higher pH promotes the precipitation of hardness components, calcium and magnesium. This creates the potential for hardness scaling of the evaporator heat transfer surfaces if not controlled. The scaling threat from hardness can be reduced by chemical addition in the form of a dispersant. The dispersant suspends the particles so that they do not stick and foul evaporator surfaces. At this time, it does not appear that it has been determined how much hardness can be controlled using a dispersant since few existing heavy oil recovery operating systems have very low hardness in the produced water. However, it is anticipated that in future heavy oil recovery processes that the produced water will include higher brackish water makeup and that the concentration of hardness in the produced water will be significant. The higher pH processes with dispersant may not be effective in produced water having a significant hardness concentration.

In addition, heavy oil recovery processes utilizing evaporators produce a concentrated brine and appropriately disposing of this concentrated brine is sometimes problematic. This is particularly true with high pH brine. High pH brine requires that the silica levels be reduced to allow disposal and ensure that silica precipitants will not plug the disposal well. This treatment process involves large amounts of acid as all of the caustic added to increase the pH must now be neutralized. As the pH is reduced, silica gels form which must be removed from the brine. Operating experience is limited for this brine treatment process, but frequent plugging of equipment and lines has been reported. If the high pH brine is to be deep well injected, the treatment process is difficult, costly and unreliable. There is an alternative option to deep well injection and that is salt cavern disposal. However, this option is significantly more expensive than deep well injection.

Therefore, there is a need in heavy oil recovery processes for a more cost-effective evaporation system for treating produced water and producing a relatively pure feedwater stream for a steam generation system.

SUMMARY OF THE INVENTION

The present invention relates to a process for cleaning and purifying produced water generated in recovering heavy oil from oil-bearing formations. The process includes evaporation of the produced water and forming a sorption slurry to prevent silica scaling of the evaporator surfaces. The sorption slurry may be formed by adding compounds, which react to form sorption suspended solids, or by sorption suspended solids, to the produced water. The suspended solids form a slurry of crystals, and silica is sorbed to the crystals preferentially in order to prevent evaporator scaling. Evaporator distillate forms a purified water suitable for steam generation which produces steam for injection into the oil-bearing formation.

In one particular process, an oil/water mixture is recovered from an oil well. Thereafter, oil is separated from the oil/water mixture to produce an oil product and produced water having a contaminant such as dissolved silica, hardness, or residual oil. A metal compound such as magnesium oxide or magnesium chloride, or any of a variety of metal oxide compounds, or alum is mixed with the produced water. When magnesium oxide or magnesium chloride is mixed with the produced water, magnesium hydroxide is formed. In this example, the method includes co-precipitating the magnesium hydroxide and silica. Thereafter, the produced water having the precipitated silica is directed to an evaporator which produces steam and a concentrated brine. The method or process further includes condensing the steam to form a distillate and directing the distillate to a steam generator and heating the distillate in the steam generator to produce steam. Thereafter, the steam is injected into an injection well, giving rise to the formation of the oil/water mixture.

In another particular process, an oil/water mixture is recovered from an oil well. Thereafter, oil is separated from the oil/water mixture to produce an oil product and produced water having a contaminant such as dissolved silica, hardness, or residual oil. A compound such as an oxide or complex oxide of Ti, Al, or Si is mixed with the produced water. These surface properties of these compounds are such that most of the silica is removed from solution. Thereafter, the produced water having the only a small amount of soluble silica is directed to an evaporator which produces steam and a concentrated brine. The method or process further includes condensing the steam to form a distillate and directing the distillate to a steam generator and heating the distillate in the steam generator to produce steam. Thereafter, the steam is injected into an injection well, giving rise to the formation of the oil/water mixture.

The other objects and advantages of the present invention will become apparent and obvious from a study of the following description and the accompanying drawings which are merely illustrative of such invention.

DETAILED DESCRIPTION OF THE INVENTION

The present invention entails a heavy oil recovery process wherein produced water is purified using a sorption slurry with an evaporation process. Distillate from the evaporation process forms feed water for use in generating steam for injecting into heavy-oil bearing underground formations. The sorption slurry prevents scaling of the evaporator heat transfer surfaces by silica compounds and in some embodiments by silica and hardness compounds in the produced water thus maintaining evaporator efficiency.

Heavy oil recovery utilizes the heat released from condensing steam to release oil from oil-bearing deposits. The resulting oil-water mixture is collected and pumped to the surface where the oil is separated from the mixture leaving what is called produced water. The produced water is re-used to generate steam to feed back into the oil-bearing formation. The present invention is directed, then, at methods of treating the produced water using a sorption slurry and evaporation to form steam generation feed water, thus re-cycling a major portion of the water used in the process of heavy oil recovery.

Produced water includes dissolved inorganic ions, dissolved organic compounds, suspended inorganic and organic solids, and dissolved gases. The total suspended solids in produced water can vary. Typically the suspended solids in produced water is less than about 100 ppm, and in some cases the suspended solids in produced water range from about 100 ppm to about 150 ppm. In addition to suspended solids, produced water from heavy oil recovery processes includes dissolved organic and inorganic solids in varying proportions. The dissolved solids, including hardness and in particular silica-based compounds, in the produced water have the potential to foul the evaporation equipment by scaling the heat transfer surfaces. Additional treatment is therefore desirable after oil-water separation to remove silica-based compounds from the produced water before evaporation. Hereinafter, the term "silica" will be used to refer generally to silica-based compounds.

The evaporation process may be accomplished using any of a variety of evaporators, including but not limited to mechanical vapor recompression evaporators, multiple effect evaporators, and falling film evaporators. In addition, the heat transfer surfaces of the evaporator can be a plate-type or tubular-type and can be horizontal or vertical, with evaporation occurring on either side of these surfaces.

Various pre-treatment processes are generally employed to assure the efficiency and effectiveness of the evaporation process. In particular, due to the presence of significant amounts of silica (typically 175 ppm to 300 ppm as $SiO_2$) in the produced water, the invention includes a sorption slurry to prevent silica scaling in the equipment.

Figure 1:
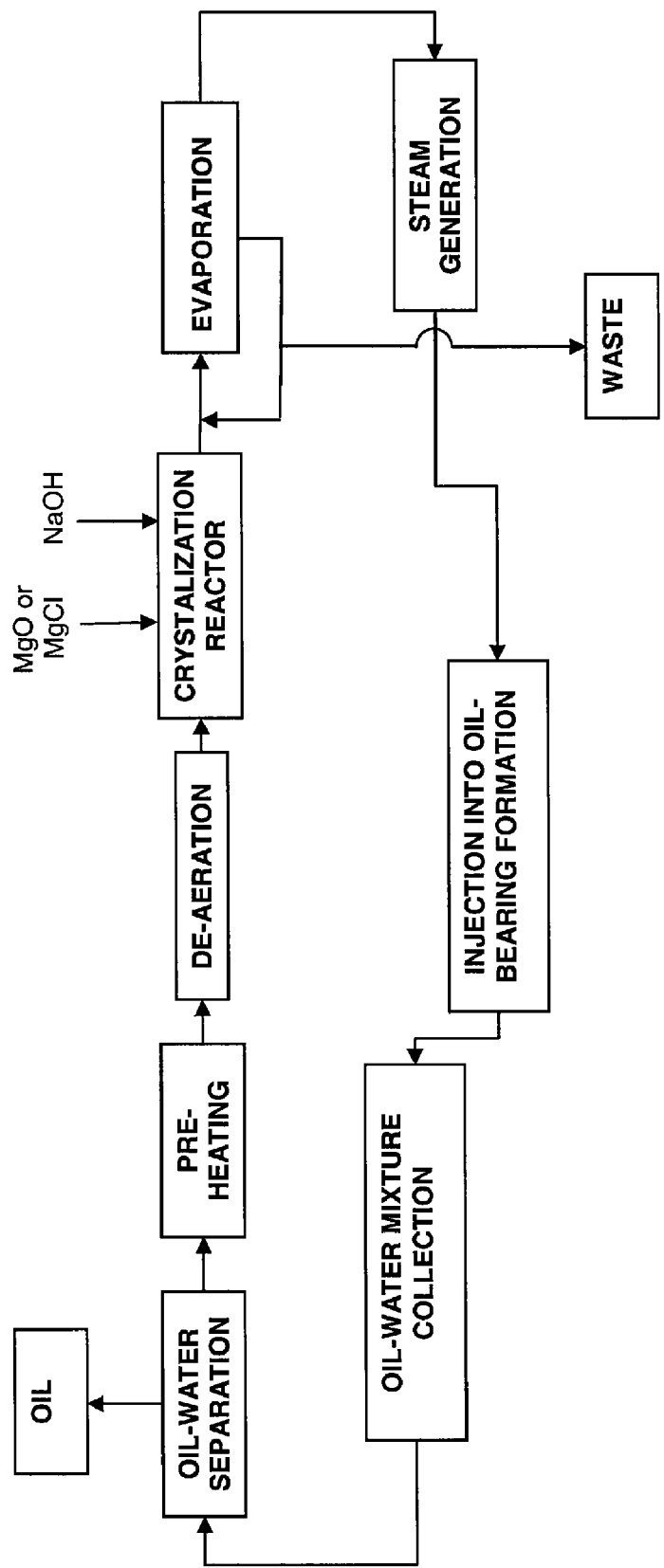
FIG. 1 is a schematic representation of the basic processes for a heavy oil recovery process according to the present invention.

Turning now to the general process according to the present invention, the process is depicted schematically in FIG. 1. Produced water is directed from an oil-water separation step to a pre-heating step followed by de-aeration, sorption compound addition, evaporation and steam generation. Preheating and de-aeration are not required but are optional. Steam from the steam generation step is directed to the oil-bearing formation where the steam condenses releasing heat to free oil from the formation. A resulting oil-water mixture is then collected and pumped to the oil-water separation step, completing the water cycle of the heavy oil recovery process.

It is appreciated that oil-water separation, pre-heating, de-aeration, and steam generation may each be accomplished by methods known to those of ordinary skill in the art. Oil-water separation may, for example, be accomplished by using gravity separation. Pre-heating the produced water enhances the efficiency of dissolved $CO_2$ removal in subsequent de-aeration. Pre-heating, if used, may be accomplished by using a heat exchanger to recover heat from one or more waste streams or from a distillate stream. Removal of dissolved $CO_2$ prior to evaporation is sometimes employed to avoid accumulation of $CO_2$ in the shell of the evaporator. Such $CO_2$ accumulation can blanket off a portion of the evaporator heat exchange area and adversely affect evaporation capacity. Deaeration can serve to remove oxygen to reduce corrosion in the evaporator. Steam generation may be accomplished by the use of boilers or various forms of steam generators.

Turning now to the sorption slurry and evaporation processes, the present invention prevents or reduces hardness and silica-based scaling of the evaporator heat transfer surfaces. Scaling is prevented by adding chemicals which comprise fine suspended solids to form a sorption slurry in the recirculating brine of the evaporation process. The suspended solids form crystals, and the crystals provide preferential sorption sites for silica. Silica sorbs to the sorption slurry and is thus pulled out of solution onto the crystals rather than precipitating on the heat transfer surfaces of the evaporator. Scaling of the evaporator surfaces is thus reduced or prevented, thereby preserving the efficiency of the evaporation process.

Generally, the evaporation step converts at least 90% of the produced water to a produced vapor which condenses to form a distillate. The distillate forms the feed water for steam generation equipment. That portion of the produced water that is not vaporized is known as concentrate or brine. The sorption slurry forms a part of the concentrate or brine. The concentrate or brine is recirculated in the evaporator. Substantially all of the solids in the evaporator feed water remain with the concentrate. A bleed or evaporator blowdown stream from the recirculation loop wastes a portion of recirculating concentrate or brine to maintain a selected brine concentration. The evaporator blowdown stream can be converted into a solid in a zero liquid discharge system (ZLD) or disposed in an injection well.

Turning now to a more detailed consideration of the sorption slurry material and the development of a sorption slurry, it is appreciated that the compound may be added to the produced water before entering the evaporator or to the recirculating brine loop in the evaporator. The material added to the evaporator may be an oxide such as magnesium oxide, calcium oxide, calcium hydroxide, or other metal oxides such as aluminum oxide or iron oxide. In addition, the material added to form the sorption slurry can be a metal compound such as magnesium chloride. In addition, the material added to form the sorption slurry can be alum. In addition, the material can be a compound such as an oxide or complex oxide of Ti, Al, or Si, which have particular surface properties. The addition of the material results in a sorption slurry in the recirculating brine loop of the evaporator. The sorption slurry comprises preferential sorption sites such that silica in the produced water preferentially sorbs or co-precipitates with the crystals rather than forming scale deposits on the evaporator heat transfer surfaces.

In the case of using magnesium oxide, magnesium is added to maintain a weight ratio of between about 0.5:1 and 3:1 of magnesium to silica in the produced water or brine. In one process design, the ratio of magnesium (Mg) to silica ($SiO_2$) is about 1.0. When added to the produced water, magnesium oxide reacts with the water to form magnesium hydroxide crystals. Magnesium oxide will raise the pH of the produced water. The magnesium hydroxide crystal sizes range typically from about 0.5 to about 10μ. In order to facilitate sorption of silica, the pH of the concentrate or brine should be at least 9.2 and preferably in the range of 10.2-11.2. The elevated pH due to having added magnesium oxide reduces the solubility of magnesium hydroxide. Substantial amounts of the silica is drawn out of solution by magnesium hydroxide sorption. The silica drawn out of solution sorbs to the magnesium hydroxide. The dissolved silica concentration is thus reduced to a relatively low level. The small remaining amount of silica tends to remain in solution and not produce scaling.

In the case of adding calcium oxide or calcium hydroxide to produced water to form the sorption slurry material, the material is also added to maintain a weight ratio of between about 0.5:1 and 3:1 of calcium to silica in the produced water. The calcium oxide or calcium hydroxide reacts with the produced water to form a slurry of calcium carbonate crystals. The sizes of the calcium carbonate crystals range from about 5 to about 20 microns. In order to facilitate sorption of silica, the pH of the concentrate or brine should be at least 9.5 and preferably in the range of 10.2-11.2. A chemical such as soda ash or sodium hydroxide or some mixture of the chemicals is added to adjust the pH to promote precipitation of calcium carbonate crystals. Typically, about 90% of the silica is sorbed and co-precipitated with the calcium carbonate crystals.

In the case of adding oxides or complex oxides of Ti, Al, Si, or similar compounds to produced water to form the sorption slurry, the material is also added to maintain a weight ratio of between about 0.5:1 and 5:1 of metal to silica in the produced water. The surface properties of the compounds are such that silica is removed from solution. The sizes of the suspended solids range from about 5 to about 100 microns. In one embodiment to facilitate sorption of silica, the pH of the concentrate or brine should be at least 9.5 and preferably in the range of 10.2-11.2. A chemical such as soda ash or sodium hydroxide or some mixture of the chemicals is added to adjust the pH to promote sorption. Typically, about 90% of the silica is sorbed and co-precipitated with the calcium carbonate crystals.

Figure 2:
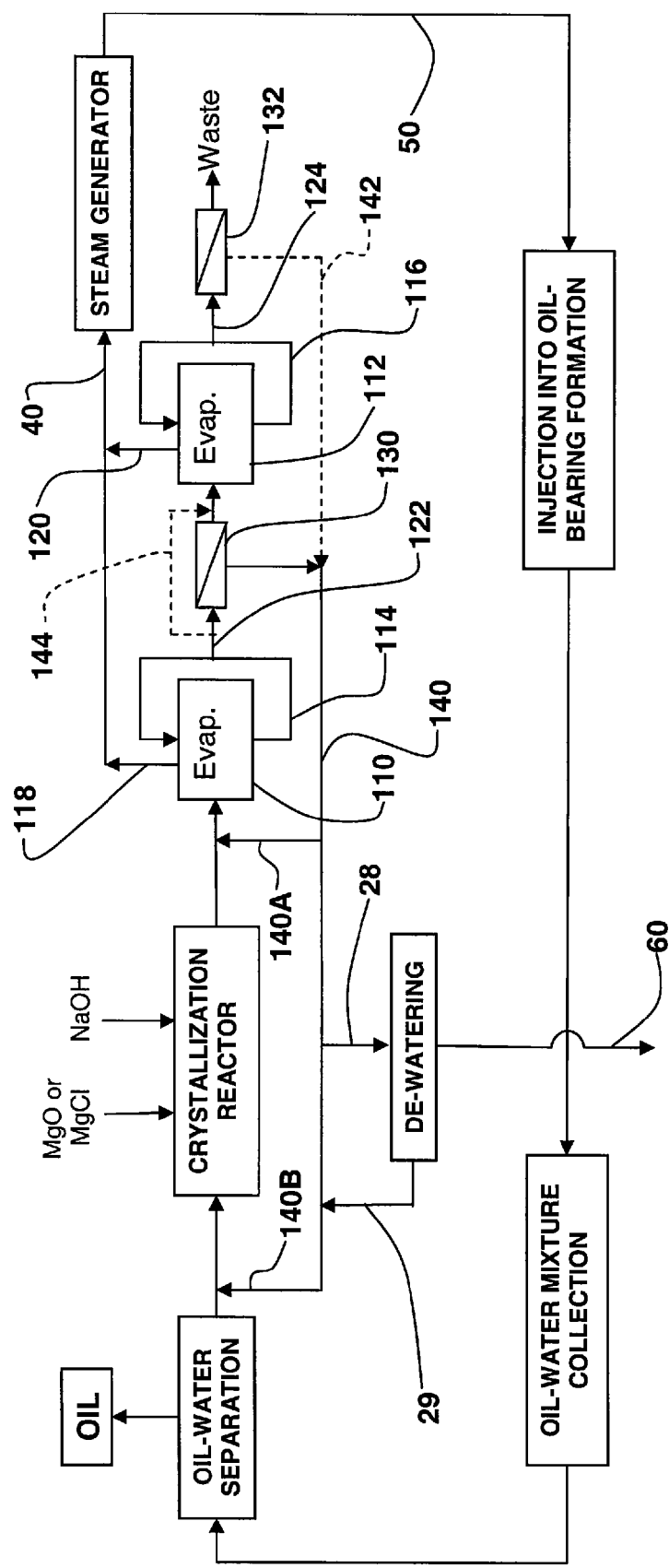
FIG. 2 is a schematic illustration of a heavy oil recovery process utilizing a crystallization reactor for removing contaminants such as silica from a produced water stream prior to the produced water stream reaching one or more evaporators.

FIG. 2 illustrates a method of treating produced water where the method utilizes the sorption slurry process described above in combination with a pair of evaporators and a pair of membranes. In the case of the FIG. 2 process, there is provided two evaporators 110, 112 generally interposed between the crystallization reactor and boiler or steam generator. Each evaporator 110, 112 includes a brine recirculation line 114, 116. Further, the evaporators 110, 112 include distillate outlet lines 118, 120. It is appreciated that the evaporators 110, 112 in conventional fashion produce steam which is condensed to form distillate which in turn is directed from the evaporators 110, 112 via outlet lines 118 and 120. Distillate outlet lines 118 and 120 are communicatively connected to a steam generator feed line 40 which in turn directs the distillate produced by the evaporators 110, 112 to the steam generator.

Two ceramic membranes 130 and 132 are associated with the evaporators 110, 112. Details of the ceramic membrane are not dealt with herein because such is not per se material to the present invention and further ceramic membranes are known in the art. For a review of general ceramic membrane technology, one is referred to the disclosures in U.S. Pat. Nos. 6,165,553 and 5,611,931, the contents of which are expressly incorporated herein by reference. Ceramic membrane 130 is interposed between evaporators 110 and 112 while ceramic membrane 132 is disposed downstream from evaporator 112. A brine feed line 122 extends from brine circulation line 114 to ceramic membrane 130. Brine feed line 124 extends from brine recirculation line 116 to ceramic membrane 132. A return line 140 directs a reject stream from one or both of the ceramic membranes 130, 132 to one or more points upstream of the first evaporator 110. As seen in FIG. 2, a portion of the concentrated brine being recirculated in lines 114 and 116 is directed to membranes 130 and 132. Membranes 130 and 132 each produce a reject stream and a permeate stream. The permeate stream of ceramic membrane 130 is directed to evaporator 112 while the permeate stream of ceramic membrane 132 is wasted or directed to other points in the process for further purification. Return line 140 is split into segments 140A and 140B. Segment 140A returns the reject stream to the evaporator 110. That is, segment 140A returns the reject to the evaporator 110 or to a point upstream of the evaporator and downstream from the crystallization zone or reactor. Segment 140B returns the reject to the crystallization zone or reactor. The return can be directed to the crystallization zone or to a point upstream of the crystallization zone and preferably downstream from the oil/water separation unit. The solids concentration in the return line 140 can be monitored and once the solids concentration in the return line reaches a threshold, portions of the reject stream can be directed into a waste stream 28 which leads to a dewatering process. The dewatering process as shown in FIG. 2 produces a concentrated waste stream 60 and a less concentrated stream 29 that is recycled to a point in the process upstream from the crystallization zone. In some cases, it may be preferable to only recycle the reject stream from the first ceramic membrane 130. In that case, the reject stream 142 from ceramic membrane 132 can be wasted or directed to other points or areas in the process. Note the bypass line 144 that extends around the first ceramic membrane 130. This allows the brine in line 122 or a portion thereof to bypass the first ceramic membrane and be introduced directly into the second evaporator 112.

In the process of FIG. 2, as discussed above, a metal compound such as magnesium oxide or magnesium chloride is mixed with the produced water in the crystallization reactor. In one example, this results in the formation of magnesium hydroxide which co-precipitates with silica in the produced water. That is, the silica is sorbed to the magnesium hydroxide crystals that are precipitated in the crystallization reactor. Thus, the precipitated silica eventually ends up in the brine recirculating in brine recirculation line 114. Substantial portions of the precipitated silica are removed by the first ceramic membrane 130. Residual soluble silica in the permeate from membrane 130 will eventually end up in the brine being circulated in line 116. Brine from line 116 is filtered by the second ceramic membrane 132 and hence, the reject stream of the second membrane may also include precipitated silica as well as other suspended solids.

It is postulated that the sorption slurry process is more efficient if there are substantial suspended solids in the produced water in the crystallization reactor. Therefore, one of the functions served by recycling the reject stream from ceramic membranes 130, 132 is that suspended solids are added to the produced water in the crystallization reactor. It is postulated that a suspended solid concentration of 5,000 to 10,000 Mg/L in the produced water in the crystallization reactor is advantageous. It is further postulated that a concentration of suspended solids on the order of 20,000 to 30,000 Mg/L is even more desirable. Hence, the system and process depicted in FIG. 2 can be provided with various monitoring and control means that are conventional in the wastewater industry for controlling the suspended solids concentration of the produced water in the crystallization reactor.

Figure 3:
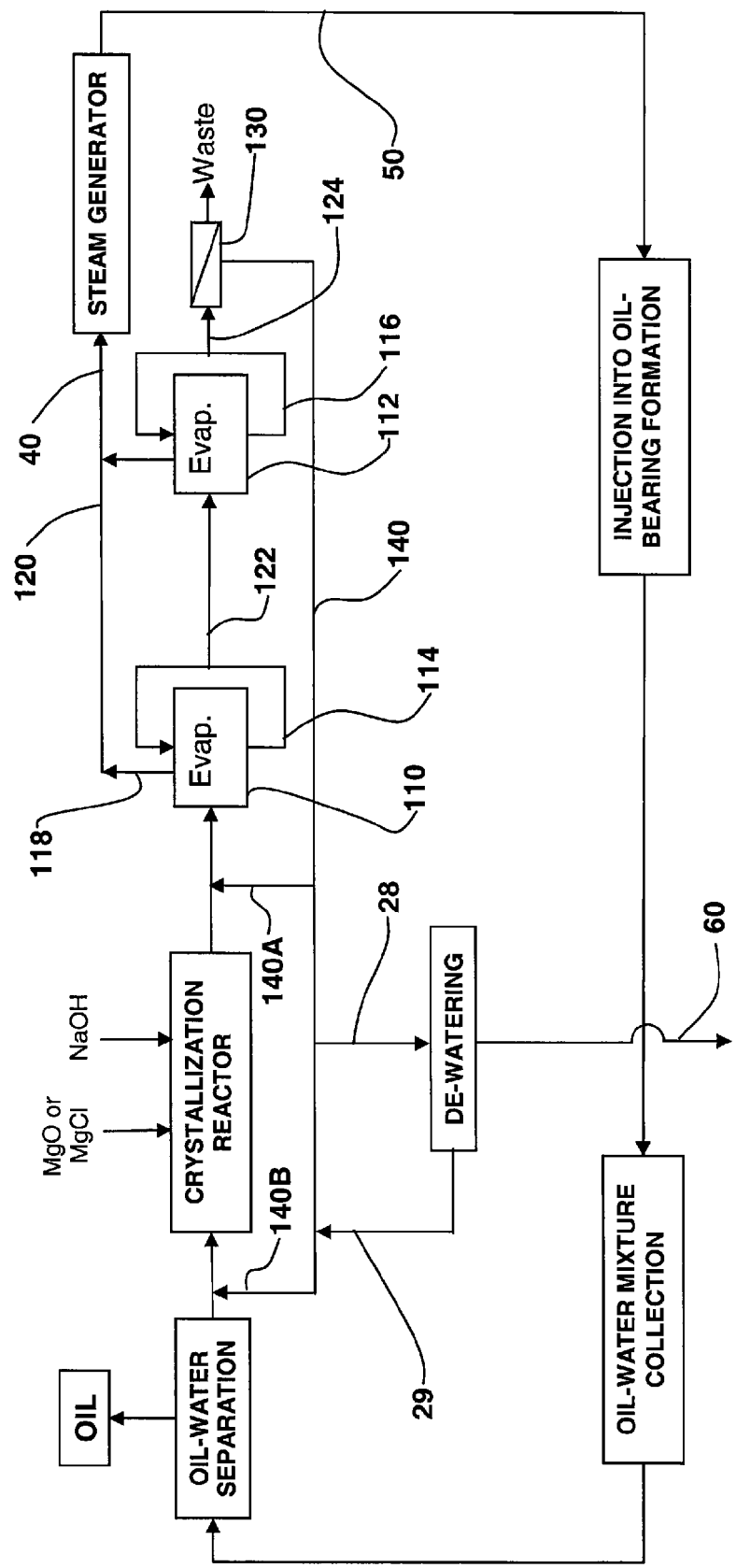
FIG. 3 is a schematic illustrating a process similar to that shown in FIG. 2 but wherein only one membrane is associated with the evaporators.

FIG. 3 illustrates a slurry process that is similar to that discussed above and shown in FIG. 2. However, in the FIG. 3 embodiment, there is provided only one ceramic membrane 130 and it is provided downstream from the second evaporator 112. In this case, the reject stream from the ceramic membrane 130 is recycled via lines 140 and 140A to evaporator 110 or to a point upstream of the evaporator 110. In addition, some of the reject stream can be recycled to the crystallization reactor or to a point upstream of the crystallization reactor via line 140B.

In the processes discussed above and shown in FIGS. 2 and 3, the membranes 130, 132 function as separation devices. In one particular embodiment, the membranes are ceramic membranes. However, it should be understood and appreciated that these separation devices could be in the form of other types of membranes or even other types of filters or separating devices such as a hydrocyclone.

In the processes shown in FIGS. 2 and 3, the retention time in the crystallization reactor can vary. In one embodiment, the retention time is approximately ten to approximately forty minutes and during this time, the produced water and the crystallization reagent or reagents are mixed thoroughly. Also, in these process embodiments, the pH of the produced water can vary but under typical conditions, could vary between a pH of about 9.2 to a pH of about 10.5, and in one preferable process the pH of the produced water could vary from about 9.7 to about 10.0. In cases where the crystallization reagent is magnesium oxide or magnesium chloride, for example, the ratio of magnesium to $SiO_2$ is about 0.5 to 3.0 and preferably about 1.0 as ppm Mg to ppm $SiO_2$. The quantity of reject recirculated in the processes shown in FIGS. 2 and 3 can vary. In one exemplary process, approximately 60% of the reject can be recirculated to upstream points. It is postulated that a preferable recirculation rate will be approximately 20% to 40%.

Figure 4:
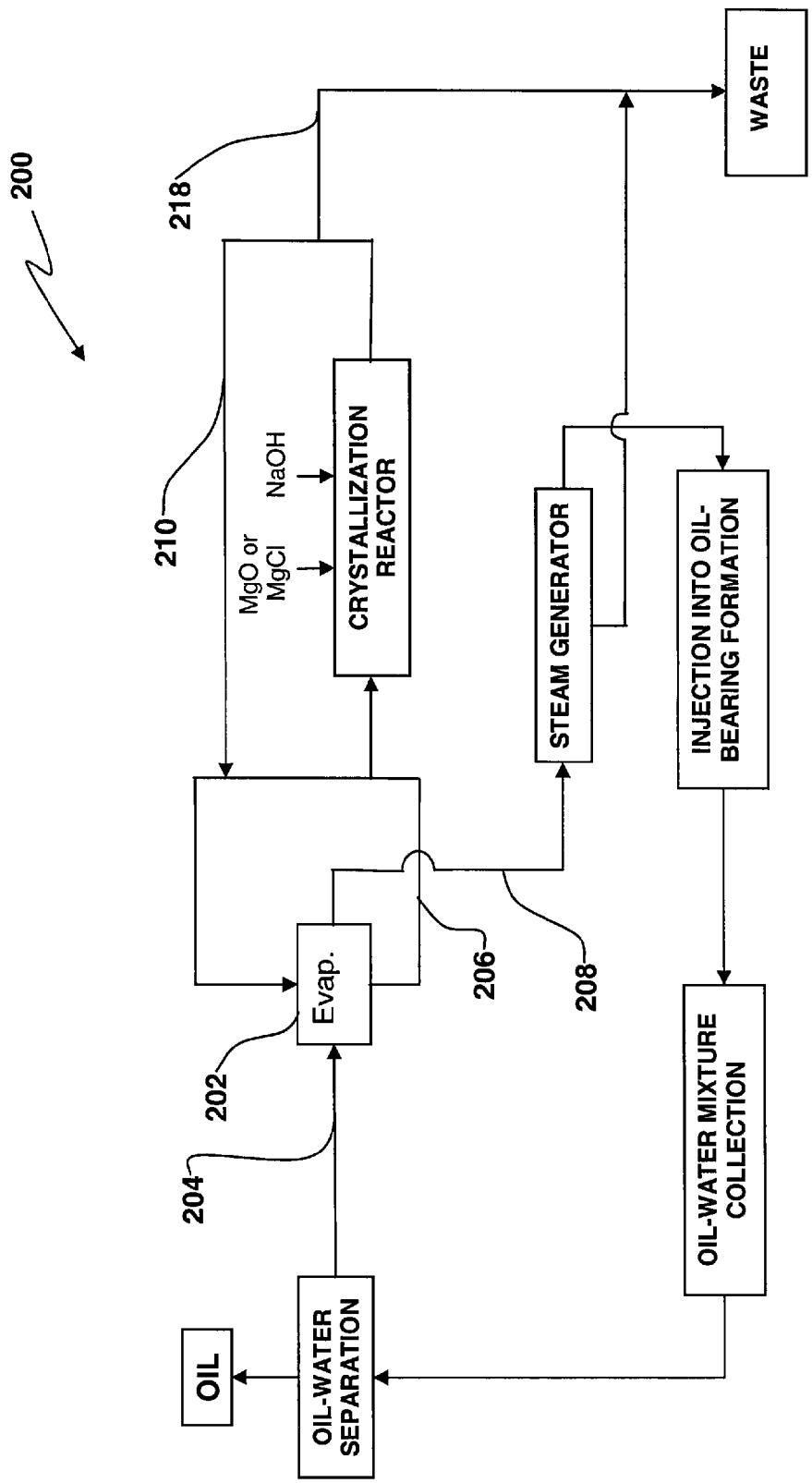
FIG. 4 is a schematic illustration of a heavy oil recovery process including a crystallization process for treating a portion of the concentrated brine being circulated about an evaporator.

Turning to FIG. 4, another sorption slurry process is shown therein. This sorption slurry process is utilized in conjunction with an evaporator. But in the case of the FIG. 4 process, the crystallization reactor is disposed downstream of the evaporator 202 and in particular is located in a side stream 210 that connects to a brine recirculation line 206. That is, as viewed in FIG. 4, produced water resulting from oil/water separation is directed through line 204 to the evaporator 202. Evaporator 202 produces steam which is condensed and directed as a distillate through line 208 to a steam generator. Furthermore, evaporator 202 produces a concentrated brine that is continuously recirculated through the evaporator in recirculation line 206. Side stream 210 connects to recirculation line 206 and functions to direct a portion of the brine being circulated in line 206 to the crystallization reactor. There, a crystallizing reagent such as magnesium oxide or magnesium chloride along with a caustic such as sodium hydroxide is added and mixed with the brine. In this process embodiment, various reagents can be mixed with the concentrated brine to precipitate various contaminants such as silica from the concentrated brine. For example, various compounds such as magnesium oxide, magnesium chloride, calcium oxide, aluminum oxide, ferric oxide and other precipitants can be added to cause contaminants to precipitate. As discussed above, in the case of magnesium oxide or magnesium chloride, magnesium hydroxide is formed and co-precipitates with silica, substantially reducing the concentration of dissolved silica in the brine. The brine including precipitated silica is directed from the crystallization reactor through side stream 210. Some of the brine with the precipitated silica can be wasted via line 218. Process variables discussed above such as retention time, pH, etc., can vary from process to process. Generally, the process variables discussed above and which are applicable to the process of FIG. 4 are generally the same.

Figure 5:
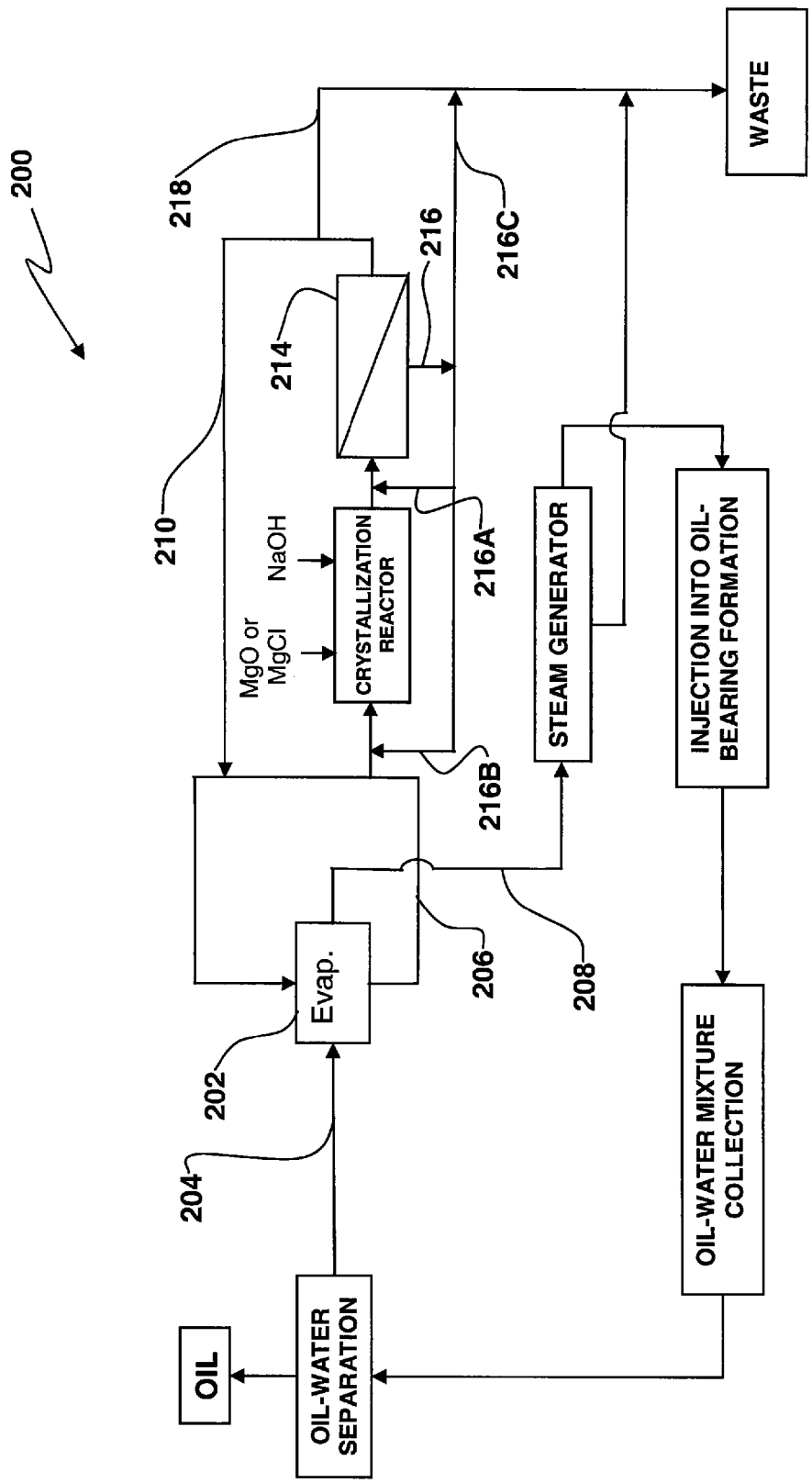
FIG. 5 is a schematic illustration of a heavy oil recovery process similar to that illustrated in FIG. 4 but wherein there is provided a membrane, such as a ceramic membrane, downstream from the crystallization reactor or zone.

Turning to the FIG. 5 process, this sorption slurry process is similar to the process shown in FIG. 4 except that membrane 214 is provided in the side stream 210 downstream from the crystallization reactor. In this case, the concentrated brine with precipitated silica is directed to a membrane 214 such as a ceramic membrane. Membrane 214 produces a reject stream that is directed from the membrane via line 216. Reject in line 216 can be selectively wasted through line 216C or can be returned to either or both segments 216A or 216B. The reject stream 216 is concentrated with suspended solids and all of the reject stream or a portion thereof can be returned to the inlet side of the membrane 214. All or a portion of the same reject can be returned to the crystallization reactor so as to increase the concentration of suspended solids in the crystallization reactor.

Example

A pilot scale test was performed on a produced water sample. The objective of the test was to determine scaling tendency. Dosages of magnesium oxide and sodium hydroxide were mixed with the produced water to simulate the sorption slurry process. The test was performed at a recovery of approximately 97%, meaning that the mass per unit of time of the distillate produced by the single evaporator used was approximately 97% of the mass per unit time of the produced water feed to the evaporator 202. The pilot testing was performed using a single tube falling film evaporator comprising a vapor body, a falling film heat exchanger, brine recirculation pump with variable speed drive, surface condenser for process vapors, steam and process condensate receivers, feed tank, and a feed pump with a variable speed drive.

The feed used for the pilot test was a produced water sample. An analysis of the produced water sample is provided in Table 1 below.

TABLE 1

| Description | Units | Feed for 97% Recovery |
|---|---|---|
| Ph | | 7.68 |
| Total Suspended Solids | ppm | 138 |
| On the Filtered Sample: | | |
| Total Solids (105 C) | % | 0.23 |
| Ash (dry solids basis) | % | 34.7 |
| Sulfate | ppm | N.D. (Color interference) |
| Chloride | ppm | 260 |
| Fluoride | ppm | 2 |
| Sulfide as S | ppm | <1 |
| TOC | ppm | 596 |
| COD | ppm | 2000 |
| Hexane Extractables (HEM) | ppm | 26 |
| Total Phenolic Compounds as $C_6H_5OH$ | ppm | 116 |
| TIC | ppm | 31 |
| Total Alkalinity as $CaCO_3$ | ppm | 333 |
| Ammonium ($NH_4$) | ppm | 66 |
| Calcium | ppm | 2 |
| Magnesium | ppm | 0.6 |
| Sodium | ppm | 321 |
| Potassium | ppm | 18 |
| Total Silica as $SiO_2$ | ppm | 255 |
| Boron (via AA) | ppm | <10 |

The pilot test was conducted over a series of days. The produced water sample was treated with 510 ppm MgO and 25 ppm NaOH. Again, the target recovery was 97%.

The pilot evaporator was pre-slurried with both magnesium oxide and sodium hydroxide. The resulting slurry contained 1.3 percent magnesium as $Mg(OH)_2$. A portion of this mixture was used to charge the pilot evaporator.

The pilot test was conducted over a time period of about 340 hours and during that time the heat transfer coefficient for the falling film heat exchange varied slightly but consistently was determined to be approximately 0.9 to 1.0 of the starting heat transfer coefficient. After approximately 340 hours of testing, the falling film evaporator tube was inspected. The top of the tube was found to have normal discoloration and the remaining portion of the tube appeared clean. A chemical cleaning was performed by circulating a mild acid solution in the evaporator for three hours at 160° F. After the acid wash, the tube was once again inspected to find that the discolorization was removed. The heat transfer coefficient and the cleanliness of the tube observed following the testing both indicate that the magnesium oxide provided an effective control of silica scaling tendency for the produced water sample at a nominal distillate recovery of 97%.

An analysis of the concentrate from the magnesium oxide base pilot test was conducted. The dissolved silica ($SiO_2$) concentration ranged from 4 to 21 ppm over the test period. The pH of the concentrate varied from approximately 9.86 to approximately 10.24. The total suspended solids as a percentage of the concentrate ranged from about 1.5 to 3.9.

The term "directing" or "direct" used herein to describe a material or flow being directed to a part of a process encompasses both direct and indirect. For example, the term directing at least a portion of the brine stream to the second evaporator means that the brine stream is directed either directly or indirectly to the second evaporator.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method of recovering oil from an oil well comprising:
   a. recovering an oil/water mixture from the well;
   b. separating oil from the oil/water mixture to produce an oil product and produced water having dissolved silica therein;
   c. directing the produced water to an evaporator and producing steam and a concentrated brine;
   d. mixing magnesium oxide or magnesium chloride with the produced water or the concentrated brine and forming magnesium hydroxide;
   e. co-precipitating the magnesium hydroxide and silica from the produced water or the concentrated brine;
   f. condensing the steam to form a distillate;
   g. directing the distillate to a steam generator and heating the distillate in the steam generator to produce steam; and
   h. injecting the steam into an injection well, giving rise to the formation of the oil/water mixture.

2. The method of claim 1 including maintaining the pH of the produced water or brine at approximately 9.8 to approximately 12.0.

3. The method of claim 1 including dosing the produced water or concentrated brine with magnesium oxide or magnesium chloride so as to maintain the weight ratio of magnesium to silica at approximately 0.5:1 to approximately 3.0:1.

4. The method of claim 3 including dosing the produced water or concentrated brine with magnesium oxide or magnesium chloride so as to maintain the weight ratio of magnesium to silica of approximately 1:1.

5. The method of claim 1 wherein the magnesium oxide or magnesium chloride is mixed with the produced water causing co-precipitation of the magnesium hydroxide and silica in the produced water; and the method includes:

a. directing the produced water with the precipitated silica to a first evaporator and evaporating the produced water to form a first brine stream and a first distillate stream; and b. directing at least a portion of the first brine stream to a second evaporator and evaporating at least a portion of the first brine stream to produce a second brine stream and a second distillate stream.

6. The method of claim 5 including separating the second brine stream into a filtrate stream and a stream concentrated with suspended solids, and recycling at least a portion of the stream concentrated with suspended solids to the first evaporator.

7. The method of claim 5 including maintaining the concentration factor of the produced water directed to the first evaporator below the concentration factor of the first brine stream directed to the second evaporator.

8. The method of claim 5 including directing the second brine stream to a ceramic membrane and separating the second brine stream into a filtrate stream and a reject stream concentrated with suspended solids and recycling at least a portion of the stream concentrated with suspended solids to the first evaporator or to a point in the process where the reject stream is mixed with the produced water.

9. The method of claim 5 including directing one or both of the first and second brine streams to a membrane and producing a reject stream, and recycling at least a portion of the reject stream to the first evaporator or to a point in the process where the reject stream is mixed with the produced water.

10. The method of claim 1 wherein there is provided two evaporators and a first separation device disposed between the two evaporators, and the method includes:

a. directing the produced water to the first evaporator and producing a first brine stream and a first distillate stream;

b. directing the first brine stream to the separation device and separating the first brine stream into a filtrate stream and a stream concentrated with suspended solids;

c. recycling at least a portion of the stream concentrated with suspended solids to the first evaporator; and d. directing the filtrate stream produced by the separation device to a second evaporator and producing a second brine stream and a second distillate stream.

11. The method of claim 10 wherein the separation device includes at least one ceramic membrane.

12. The method of claim 10 wherein there is provided a second separation device disposed downstream of the second evaporator and the method includes directing at least a portion of the second brine stream to the second separation device and producing a second filtrate stream and a second stream concentrated with suspended solids; and recycling at least a portion of the second stream concentrated with suspended solids to the first evaporator.

13. The method of claim 12 including bypassing the first separation device disposed between the two evaporators with at least a portion of the first brine stream such that a portion of the first brine stream is directed to the second evaporator without being filtered by the first separation device.

14. The method of claim 1 including raising the pH of the brine or produced water to approximately 9.8 to approximately 12.0 by mixing the magnesium oxide or magnesium chloride with produced water.

15. The method of claim 1 including:

a. recirculating the concentrated brine through a brine recirculating line associated with the evaporator;

b. directing at least some of the concentrated brine from the brine recirculating line to a side stream;

c. mixing the magnesium oxide or magnesium chloride with the concentrated brine in the side stream and forming magnesium hydroxide in the concentrated brine in the side stream; and d. co-precipitating the magnesium hydroxide and silica from the concentrated brine.

16. The method of claim 15 including returning at least some of the concentrated brine from the side stream to the brine recirculating line.

17. The method of claim 15 including after mixing magnesium oxide or magnesium chloride with the concentrated brine in the side stream, directing the concentrated brine to a membrane disposed in the side stream and filtering the concentrated brine to form a permeate stream and a reject stream concentrated with suspended solids.

18. The method of claim 1 wherein silica is precipitated from the produced water or concentrated brine; and wherein the method includes directing the produced water with precipitated silica or the concentrated brine with precipitated silica to a separator and producing a low suspended solids stream and a high suspended solids stream concentrated with suspended solids; and recycling at least a portion of the high suspended solids stream to the produced water or the concentrated brine to increase the concentration of suspended solids therein.

19. The method of claim 18 including recycling sufficient quantities of the reject stream to the produced water or concentrated brine so as to maintain the concentration of suspended solids in the produced water or concentrated brine at 10,000 Mg/L or higher.

20. A method of recovering oil from an oil well, comprising:

a. recovering an oil/water mixture from the well;

b. separating oil from the oil/water mixture to produce an oil product and a produced water having dissolved silica therein;

c. directing the produced water to an evaporator and producing steam and a concentrated brine;

d. recirculating the concentrated brine through a recirculating brine line associated with the evaporator;

e. directing brine from the brine recirculating line to a side stream having a mixing tank;

f. mixing a precipitant with the concentrated brine in the mixing tank in the side stream;

g. precipitating silica in the concentrated brine in the side stream;

h. returning at least a portion of the concentrated brine with the precipitated silica in the side stream to the brine recirculating line;

i. condensing the steam produced by the evaporator to form a distillate;

j. directing the distillate to a steam generator and heating the distillate in the steam generator to produce steam; and k. injecting the steam into an injection well, giving rise to the formation of the oil/water mixture.

21. The method of claim 20 including mixing magnesium oxide or magnesium chloride with the concentrated brine in the mixing tank in the side stream and forming magnesium hydroxide in the concentrated brine in the side stream; and co-precipitating magnesium hydroxide and silica in the concentrated brine in the side stream.

22. The method of claim 20 wherein after mixing the precipitant with the concentrated brine, directing the concentrated brine to a membrane and filtering the concentrated brine and producing a filtrate stream and a reject stream concentrated with suspended solids.

23. The method of claim 22 including recycling at least a portion of the reject stream and mixing the reject stream with the concentrated brine upstream of the membrane, increasing the concentration of suspended solids in the concentrated brine.

24. The method of claim 23 including maintaining the concentration of suspended solids in the mixing tank at 10,000 Mg/L and higher.

* * * * *